United States Patent
Ueki et al.

[11] Patent Number: 6,131,109
[45] Date of Patent: Oct. 10, 2000

[54] MULTITASK PROCESSOR, A MULTITASK PROCESSING METHOD, A MULTITASK PROCESSING DISPLAY METHOD AND A STORAGE MEDIUM FOR PROCESSING BY CORRELATING TASK AND OBJECT

[75] Inventors: Katsuhiko Ueki, Tokyo; Masato Igarashi, Yachiyo; Takeshi Yasuda, Yokohama; Noriaki Koyama, Inagi; Masaaki Okajima; Ikuya Odahara, both of Kawasaki, all of Japan

[73] Assignee: Kabushiki Kaisha Toshiba, Kawasaki, Japan

[21] Appl. No.: 09/028,639

[22] Filed: Feb. 24, 1998

[30] Foreign Application Priority Data

Feb. 24, 1997 [JP] Japan .................................. 9-038996

[51] Int. Cl.[7] .................................................. G08F 9/00
[52] U.S. Cl. ............................................................. 709/107
[58] Field of Search ..................................... 709/100, 102, 709/103, 104, 106, 107, 108; 345/440, 326, 356; 717/4; 340/550, 942

[56] References Cited

U.S. PATENT DOCUMENTS

| | | |
|---|---|---|
| 4,885,717 | 12/1989 | Beck et al. ................................ 395/704 |
| 5,519,867 | 5/1996 | Moeller et al. . |
| 5,592,600 | 1/1997 | Pauw et al. ............................... 395/140 |
| 5,606,699 | 2/1997 | Pauw et al. ............................... 709/303 |
| 5,845,125 | 12/1998 | Nishimura et al. ...................... 709/104 |

*Primary Examiner*—Majid A. Banankhah
*Attorney, Agent, or Firm*—Oblon, Spivak, McClelland, Maier & Neustadt, P.C.

[57] ABSTRACT

The debug assisting apparatus comprises a task information recording device to record the execution information of task A, task B, and task C executed by the OS 1 in multitask processing, an object execution information recording device to record the information of the objects operated by the tasks, an information merging device both to chronologically merge the recorded object execution information and execution information of task A, task B, and task C and to store such information as the program operation history in a history storing device, and an output data generating device to generate the output data showing the execution progress of task A, task B, and task C and the operation of the objects in association according to the operation history table in the history storing device and output such data to the input/output device (monitor).

20 Claims, 13 Drawing Sheets

FIG. 2

```
/*Task & flag layout in memory ansd entry to OS*/
/*CRE_TSK(Task identifier, initial status, task function, priority);*/
CRE_TSK(1,Ready, taskA, 1);
CRE_TSK(2,Dormant, taskB, 2);
CRE_TSK(3,Dormant, taskC, 3);

/*CRE_FLG(Flag identifier, initial value)*/
CRE_FLG(1,0)

class Player
    {
        int nim;
        char *myname;
    public:
        Player(char *name) { };
        ~Player() { };
        int readNum();
        void setNum(int no);
    };

class Dice
    {
    public:
        Dice() { };
        ~Dice() { };
        int roll();
    };

class DiceGame
    {
        int counter;  /*To indicate number of players entered to game*/
        int winner;   /*To indicate entry No. of winner*/
    public:
        DiceGame() { };
        ~DiceGame() { };
        void ready();
        void play();
        void entry(Player&);
        int winnerIs();
    };
```

FIG. 3A

```
Task init Task ( ) {
Dicegame dicegame ;
Player playerB ("BOOK") ;
Player playerC ("COOK") ;
Dice dice ;
}

TASK taskA (INTstacd)
    {
        dicegame,ready ( ) ;   / *Game preparation*/
        dicegame,play ( ) ;    / *Game start*/
    }

TASK taskB (INTstacd)
    {
        dicegame,entry (playerB) ;   / *Entry to game* /
        if (dicegame,winnerIs ( )= =playerB,readNum ( )) / *Check whether
         operator is winner* /
            {
                dice,roll ( ) ;   / *To roll dice if player is winner* /
            }
    }

TASK taskC (INTstacd)
    {
        dicegame,entry (playerC) ;   / *Entry to game* /
        if (dicegame,winnerIs ( )= =playerC,readNum ( )) / *Check whether
         operator is winner* /
            {
                dice,roll ( ) ;   / *To roll dice if player is winner * /
            }
    } void Dicegame : : ready ( )
    {
        counter=0 :
        wup_tsk (2) ;   / *TaskB activation* /
        wup_tsk (3) ;   / *TaskC activation* /
        wai_flg (1,2) ;   / *Waiting for entry* / void Dicegame : : play ( )
    {
        if (dice,roll ( )>=4) {winner=1 ; } / *Player 1 is winner if dice is
         4 or more* /
        else {winner=2 ; } / *Player 2 is winner if dice is 3 or less* /
    }
```

FIG. 3B

```
void Dicegame : : entry (Player&player)
{
    counter++ ;
    player.setNum (counter) ;   / *Entry number provided to players */
    set_flg (1,counter) ;
    wai_flg (1,2) ;   / *Waiting for entry* /
}
``` int Dicegame : : winnerIs ( ) {return winner ; } / * Winner reading * / int Dice : : roll ( ) {return (RND ( )*6+1) ; }
/ * Note : RND ( ) is a function to return a random number above 0 and below 1* / int Player : : readNum ( ) {return num ; } / *Entry No, reading */ void Player : : setNum (int no) {num=no ; } / *Entry No. setting */

FIG. 4

| TASK IDENTIFIER | TASK NAME |
|---|---|
| 0 | Init Handler |
| 1 | task A |
| 2 | task B |
| 3 | task C |

| OBJECT IDENTIFIER | OBJECT NAME | CLASS IDENTIFIER |
|---|---|---|
| 0x2210 | dicegame | DiceGame |
| 0x2240 | playerB | Player |
| 0x2260 | playerC | Player |
| 0x2290 | dice | Dice |

| CLASS NAME | CLASS IDENTIFIER |
|---|---|
| DiceGame | DiceGame |
| Player | Player |
| Dice | Dice |

| SYSTEM CALL NAME |
|---|
| wup_tsk ( ) |
| set_flg ( ) |
| wai_flg ( ) |
| wai_tsk ( ) |

FIG. 8

| HISTORY ORDER | TASK / OBJECT | EVENT TYPE | EVENT CONTENTS |
|---|---|---|---|
| 1) | 1 | status | Ready |
| 2) | 2 | status | Dormant |
| 3) | 3 | status | Dormant |
| 4) | (NONE) | task switching | 0 |
| 5) | 0x2210 | call | DiceGame( ) |
| 6) | 0x2210 | end | DiceGame( ) |
| 7) | 0x2240 | call | Player(char*) |
| 8) | 0x2240 | end | Player(char*) |
| 9) | 0x2260 | call | Player(char*) |
| 10) | 0x2260 | end | Player(char*) |
| 11) | 0X2290 | call | Dice( ) |
| 12) | 0X2290 | end | Dice( ) |
| 13) | 0 | task switching | 1 |
| 14) | 1 | status | Run |
| 15) | 0X2210 | call | ready( ) |
| 16) | (NONE) | call | wup_tsk( ) |
| 17) | 2 | status | Ready( ) |
| 18) | (NONE) | end | wup_tsk( ) |
| 19) | (NONE) | call | wup_tsk( ) |
| 20) | 3 | status | Ready |
| 21) | (NONE) | end | wup_tsk( ) |
| 22) | (NONE) | call | wai_flg( ) |
| 23) | 1 | status | Wait |
| 24) | 1 | task switching | 2 |
| 25) | 2 | status | Run |
| 26) | 0x2210 | call | entry( ) |
| 27) | 0x2240 | call | setNum( ) |
| 28) | 0x2240 | end | setNum( ) |
| 29) | (NONE) | call | set_flg( ) |
| 30) | (NONE) | end | set_flg( ) |
| 31) | (NONE) | call | wai_flg( ) |
| 32) | 2 | status | Wait |
| 33) | 2 | task switching | 3 |
| 34) | 3 | status | Run |

FIG. 9

| TYPE | CLASS / OBJECT IDENTIFIER |
|------|---------------------------|
| O    | "0x2210"                  |
| O    | "0x2290"                  |
| C    | "Player"                  |

| TASK IDENTIFIER |
|-----------------|
| 1               |
| 2               |
| 3               |

MULTITASK PROCESSOR, A MULTITASK PROCESSING METHOD, A MULTITASK PROCESSING DISPLAY METHOD AND A STORAGE MEDIUM FOR PROCESSING BY CORRELATING TASK AND OBJECT

BACKGROUND OF THE INVENTION

1. Field of the Invention

The present invention relates to a multitask processor, a multitask processing method and a multitask processing display method and a storage medium that are used, for example, when testing or debugging a multitask object-oriented program.

2. Description of the Related Art

Conventionally, it is not easy to check program processes one by one in testing or debugging of a multitask program created in the object-oriented environment. Improvement is desired for such checking.

When a multitask object-oriented program is prepared by describing an application program in object-oriented language for execution in the multitask processing (such program is hereinafter referred to as the "program"), the program is generally test-run and debugged on an actual computer so that the program is completed in a more improved form.

When debugging a created program, for example, it is important to analyze and examine the entire program or some of the objects in the program with establishing correspondence between the task operation status information whether the task is in waiting or in operation and the information about the object operated by the task and about the method for the operation.

While the information about the task status is at the level of the operation system (hereinafter abridged as "OS"), the information related to the object and method is at the application level. They exist at different levels. It is difficult to record these two different types of information (task and object) with establishing correspondence between them.

Conventionally, the names of the events occurring in execution of the individual tasks are recorded as the history on the axis of task execution time so that the user can verify the program by examining the execution status of the individual tasks and the event occurrence timing.

In the multitask processing, however, several tasks mutually operate objects. Therefore, it is quite difficult for a user who is checking the execution status of the individual tasks, to verify whether the operation contents of the entire program or some of the objects are appropriate or not. It takes so much time, for example to find a programming bug which causes task switching by scheduling and accessing to objects to be made in an unexpected order, for example. Such conventional method has a poor debugging efficiency.

SUMMARY OF THE INVENTION

The present invention has been made considering the problems above.

A first object of the present invention is to provide a multitask processor, a multitask processing method, a multitask processing display method and a storage medium which enable the user to efficiently debug or test programs in development of multitask programs under the object-oriented environment.

A second object of the present invention is to provide a multitask processor, a multitask processing method, a multitask processing display method and a storage medium which can display the task operating the object to which the user is paying attention in development of multitask programs under the object-oriented environment.

A third object of the present invention is to provide a multitask processor, a multitask processing method, a multitask processing display method and a storage medium which can display the operation of the task to which the user is paying attention in development of multitask programs under the object-oriented environment.

A fourth object of the present invention is to provide a multitask processor, a multitask processing method, a multitask processing display method and a storage medium which enables the user to easily find a bug caused by scheduled task switching and object access conducted in an unexpected order.

A fifth object of the present invention is to provide a multitask processor, a multitask processing method, a multitask processing display method and a storage medium which enables efficient debugging as described above even in debugging of multi-thread programs written in Java language in particular.

To attain the above objects, a multitask processor and a storage medium according to the present invention comprise a history recording means to chronologically record the task execution information obtained by executing a multitask processing program and the object information in the program operated by the task, means to chronologically combine the task execution information and the object information which are both recorded by the said history recording means, and means to express the chronologically combined task and object operation status in association. By "to chronologically combine", this invention means to correlate the task operated on a certain time and the object operated on the same time.

According to the present invention, a multitask processor and a storage medium comprise a task information recording means to chronologically record first information about task obtained by executing a program written in object-oriented language for multitask processing, an object information recording means to chronologically record second information about the object in the program operated by the task, means to generate third information about the operation history of the program by chronologically combining the first information of the task information recording means and the second information of the object information recording means, a history storing means to store the third information generated, and means to generate the data simulating the operation of particular object and task in association based on the third information of the history storing means.

According to the present invention, a multitask processor and a storage medium comprise means to generate the history information by chronologically combining the task execution information obtained by executing a program for multitask processing and the information of the object in the program operated by the task, means to display a first area for the task and a second area for the object on the same screen, and means to appropriately display the generated history information on the screen containing the first area and the second area.

According to the present invention, a multitask processing method comprises a step to chronologically record the task execution information obtained by executing a multitask processing program and the object information in the program operated by the task, a step to chronologically combine the task execution information and the object information recorded as above, and a step to express the chronologically combined task and object operation status in association.

According to the present invention, a multitask processing method comprises a step to chronologically record first information about task obtained by executing a program written in object-oriented language for multitask processing, a step to chronologically record second information about the object in the program operated by the task, a step to generate third information about the operation history of the program by chronologically combining the first information and the second information, and a step to generate the data simulating the operation of particular object and task in association based on the third information.

According to the present invention, a multitask processing display method comprises a step to generate the history information by chronologically combining the task execution information obtained by executing a program for multitask processing and the information of the object in the program operated by the task, a step to display a first area for the task and a second area for the object on the same screen, and a step to appropriately display the generated history information on the screen containing the first area and the said second area.

According to the present invention, a multitask processing display method comprises a step to chronologically record first information about task obtained by executing a program written in object-oriented language for multitask processing, a step to chronologically record second information about the object in the program operated by the task, a step to generate third information about the operation history of the program by chronologically combining the first information and the second information, and a step to generate the data simulating the operation of particular object and task in association based on the third information of the history storage means.

According to the present invention, the chronologically combined task and object operation statuses are expressed in association so that the user can both well understand the relation between the task and object and easily grasp the program contents.

In addition, according to the present invention, the identifiers of the specified objects and tasks are stored in the identifier storing means. During program execution, the object execution information recording means records the object information, and the task information recording means records the task information. Then, during or after program execution, the information merging means combines the object information and the task information to generate the history information of the program operation and stores such information in the history storing means. The output data generating means generates the output information using the history information in the history storing means, the object identifier information in the object identifier storing means and the task identifiers in the task identifier storing means and outputs such information to the output means. Therefore, the user can appropriately understand the chronological operation status of the tasks and objects.

According to the present invention, the above history information can be displayed for the particular tasks and objects specified by the user.

According to the present invention, the operation status of the tasks and objects are expressed in association so that the user can easily find a bug caused by scheduled task switching and object access conducted in an unexpected order.

According to the present invention, the displayed data are divided into groups corresponding to the task groups con-tained in thread. Therefore, even debugging of multi-thread programs such as those in Java language can be made efficiently as described above.

BRIEF DESCRIPTION OF THE DRAWINGS

FIG. 2 is a diagram to show a source program of a multitask object-oriented program as an example to be debugged by the debug assisting apparatus of FIG. 1;

FIG. 3A and FIG. 3B are diagrams to show a source program of a multitask object-oriented program as an example to be debugged by the debug assisting apparatus of FIG. 1;

FIG. 4 is a diagram to show an example of task identifier table in the debug assisting apparatus of FIG. 1;

FIG. 5 is a diagram to show an example of object identifier list in the debug assisting apparatus of FIG. 1;

FIG. 6 is a diagram to show an example of class identifier list in the debug assisting apparatus of FIG. 1;

FIG. 7 is a diagram to show an example of system call name in the debug assisting apparatus of FIG. 1;

FIG. 8 is an example of history information table in the debug assisting apparatus of FIG. 1;

FIG. 9 is a diagram to show an example of class/object identifier storage table in the debug assisting apparatus of FIG. 1;

FIG. 10 is a diagram to show an example of task identifier storage table in the debug assisting apparatus of FIG. 1;

DESCRIPTION OF PREFERRED EMBODIMENT

Referring to the attached figures, a preferred embodiment of the present invention will be described below.

Figure 1:
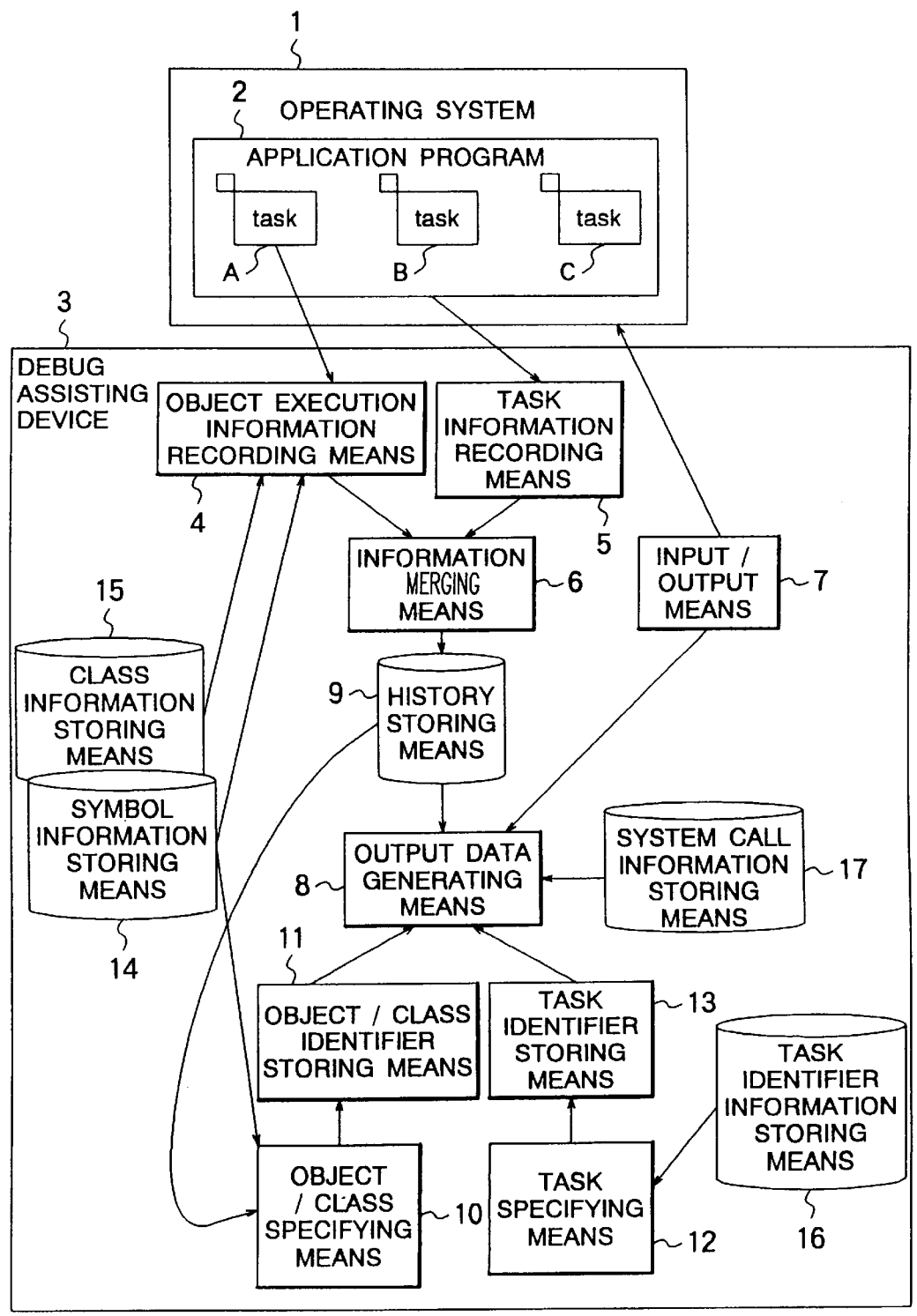
FIG. 1 is a diagram to show the configuration of a debug assisting apparatus according to an embodiment of the present invention.

FIG. 1 is a diagram to show the configuration of a debug assisting apparatus as an embodiment of the multitask processor according to the present invention.

In the figure, an operating system (hereinafter referred to as "OS") 1 is an operating system used in this debugging assisting apparatus 3. The OS 1 establishes the correspondence between the user-defined task names and task identifiers in advance on program compiling. A multitask object-oriented language program (hereinafter referred to as the "application program") 2 is described with source program as shown in FIG. 2, FIG. 3A and FIG. 3B, for example, and consists of several tasks (task A, task B and task C, for example).

The debug assisting apparatus 3 loads the OS 1 and the application program 2 to execute the application program 2 under the environment of the OS 1 and at the same time provides the assisting display for user's debugging the application program 2. An object execution information recording means 4 detects function calls and returns from function including method system calls during program execution, interprets the object names and function names according to the object identifier information in a symbol information storing means 14 and the class identifier information in a class information storing means 15, and sends such data as the object execution information to an information merging means 6.

A task information recording means 5 detects task switching operations and task status changes from the OS 1 during program execution and sends such detection data as the task information to the information merging means 6. The information merging mean 6 sequentially stores to a history storing means 9, the information sent from the object execution information recording means 4 and the task information recording means 5 during program execution. An input/output means 7 makes, according to input from the user, a request for output information generation to an output data generating means 8 and outputs the output information sent from the output data generating means 8. The input/output means 7 provides instruction to activate and stop the application program 2. The input/output means 7 can be realized by a mouse, keyboard, external storage, monitor, printer, and so on, for example.

According to the output information generation request from the input/output means 7, the output data generating means 8 generates the output information using the system call names stored in a system call information storing means 17, object identifiers and class identifiers stored in an object/class identifier storing means 11, task identifier information stored in a task identifier storing means 13, and history information stored in the history storing means 9, and send such output information to the input/output means 7. The object specifying means 10 stores, according to the user's input operation, the object identifier or class identifier specified by the user to the object/class identifier storing means 11.

A task specifying means 12 stores, according to the user's input operation, the task identifier specified by the user to the task identifier storing means 13. The symbol information storing means 14 stores the symbol information generated during compiling of the application program 2. The class information storing means 15 stores the class information generated during compiling of the application program 2. A task identifier information storing means 16 stores the task information generated during compiling of the application program 2. The system call information storing means 17 stores the system call information prepared for each OS.

Next, the operation of this debug assisting apparatus 3 is described below.

The application program 2 debugged on this debug assisting apparatus 3 is, as shown by description of source programs in FIG. 2, FIG. 3A and FIG. 3B, a dice game program played by several players.

Here, the operation of the application program 2 consisting of task A, task B and task C executed on the debug assisting apparatus 3, and the operation of displaying each task operation in association with the object operation are described below.

Firstly described is the preparation of task/object/class information.

When the application program 2 is compiled onto the debug assisting apparatus 3, the debug assisting apparatus 3 prepares a task identifier table 40 for task identifier information as shown in FIG. 4, an object identifier list 41 for symbol information as shown in FIG. 5 and a class identifier list 42 for class information as shown in FIG. 6.

Referring to this example, as shown in the task identifier table 40 of FIG. 4, the tasks with the names "Init Handler", "task A", "task B" and "task C" have the identifiers "0", "1", "2", and "3", respectively. In addition, as shown in the object identifier list 41 of FIG. 5, the object identified by the object name "dicegame" (hereinafter referred to "dicegame object") belongs to the class with the class identifier "Dicegame" and has an object identifier "0x2210". Similarly, the objects identified by the object names "player B" and "player C" (hereinafter referred to as "player B object" and "player C object") both belong to the class having a class identifier "Player" and have an object identifier "0x2240" and "0x2260", respectively. The object identified by the object name "dice" (hereinafter referred to as "dice object") belongs to the class having a class identifier "Dice" and has an object identifier "0x2290".

As shown in the class identifier list 42 of FIG. 6, classes "Dicegame", "Player", and "Dice" have class identifiers "Dicegame", "Player", and "Dice", respectively.

The system call names as system call information stored in the system call information storing means 17 include, as shown in FIG. 7, changing task status system call "wup_tsk( )", flag setting system call "set_flg", a system call "wai_flg", which is to wait for a flag to become a particular status, and a system call "wai_tsk( )" which is to wait for a task to become a particular status, and so on.

Upon user's activation instruction, the input/output means 7 activates the application program 2.

When the application program 2 is activated, task A is in a status of being ready for execution (Ready status); task are B and task C are in a status of being suspended (Dormant status), as described in the source programs of FIGS. 2 and 3.

In this activation, the task information recording means 5 obtains the information about the initial status of task A, task B and task C (initial status information) from the OS 1 and sends it to the information merging means 6. The information merging means 6 records the sent initial status information to the history storing means 9.

To initialize dicegame, player B, player C and dice, which are objects of the application program 2, the OS 1 activates an initialization handler (not shown) and executes the constructor for each of them. The task information recording means 5 detects the start and end of the initialization handler and sends the information of such detection to the information merging means 6. The object execution information recording means 4 detects constructor execution and sends the information of such detection to the information merging means 6.

The information merging means 6 firstly records the activation of the initialization handler to the history storing means 9 and then records the activation and termination of the constructors to the history storing means 9. Though any information sent by the task information recording means 5 or the object execution information recording means 4 to the information merging means 6 is always recorded to the history storage means 9, such processing sometimes is omitted in the description below.

Upon completion of initialization handler operation, the OS 1 switches to task A in Ready status and activates task A. The activated task A is shifted from Ready status to Run status. The task information recording means 5 detects the initialization handler completion, task switching and task status change at the OS 1 and sends such detection information to the information merging means 6.

As shown in the definition of task A in FIG. 3A, task A firstly calls the "ready( )" method of dicegame object. The called "ready( )" method comprises, as shown in the definition of "ready( )" method in FIG. 3A, the system call "wup_tsk( )" to change the task status from Dormant status to Ready status (Task status change) and the system call "wai_flg( )" to wait for a flag to become a particular status. Specifically, the counter value is firstly set to 0 and then, Task B with ID No. "2" is changed from Dormant status to Ready status with "wup_tsk(2)". The object execution information recording means 4 detects issuance of the system call "wup_tsk(2)" and sends such detection information to the information merging means 6. The task information recording means 5 detects that the status of task B is changed to Ready and sends such detection information to the information merging means 6.

Next, "wup_tsk(3)" is used to change Task C with ID No. 3 from Dormant status to Ready status. The object execution information recording means 4 similarly detects issuance of the system call "wup_tsk(3)" and sends such information to the information merging means 6. The task information recording means 5 detects that the status of task C is changed to Ready and sends such detection information to the information merging means 6.

"wai_flg(1,2)" on the following line is the system call to wait for "flg 1" to become the status "2". Issuance of this system call "wai_flg(1)" is detected by the object execution information recording means 4 and sent to the information merging means 6. At the same time, change of task A to Wait status by issuance of the system call "wai_flg(1)" is detected by the task information recording means 5 and sent to the information merging means 6.

When this task A enters Wait status, task B and task C remain as the subjects of execution. Here, scheduling of OS 1 is conducted so that the task to be executed is switched to task B. The task information recording means 5 detects this switching and sends such detection information to the information merging means 6.

As shown in the definition of task B in FIG. 3A, task B calls "entry( )" method for the created object "dicegame". This call is detected by the object execution information recording means 4 and the detection information is sent to the information merging means 6.

The called "entry( )" method comprises, as shown in the definition of "entry( )" method in FIG. 3B, "counter++" to increment the counter value by one, the method "Player.setNum( )" to set the value in "( )" for "setNum( )" specified in Player class, the system call "set_flg" for flag setting, and the system call "wai_flg( )" to wait for a flag to become a particular status. Specifically, after incrementing the counter value by one by means of execution of "entry( )" method, the counter value is set in the memory area "setNum" of the object "Player B" by execution of "Player.setNum(counter)". Upon return from the "setNum( )" method, such return is detected by the object execution information recording means 4. The flag is set by "set_flg(1, counter)". At this moment, the counter value is "1" and the flag value is also "1". When the system call "wai_flg(1,2)" is issued, this issuing is detected by the object execution information recording means 4 and such detection information is sent to the information merging means 6. By issuance of this system call "wai_flg(2)", task B also enters Wait status, which is detected by the task information recording means 5 and such detection information is sent to the information merging means 6.

Here, scheduling the OS 1 is conducted so that the task to be executed is switched to task C. The task information recording means 5 detects the switching and sends this detection information to the information merging means 6.

While the application program 2 continues such processing, every information is recorded in the debug assisting apparatus 3. When, upon completion of task C, the user instructs to stop execution of the application program 2 from the input/output means 7, the processing is terminated.

As shown in FIG. 8, the history information until such processing termination is recorded in the columns of task/object type, event type, and event contents on a history information table 50 according to the order of occurrence (event occurrence). The contents of the history information table 50 are a part of the history information.

Next, selection of the display conditions will be described below.

Suppose that, upon completion of recording, the user refers both to the selectable object identifier list 41, which is generated from the history information stored onto the history storing means 9 by the object specification means 10 and the symbol information in the symbol information means 14, and to the class identifier list 42 stored in the class information storing means 15; eventually the user selects "Object dice", "Object dicegame", "Player class" and other data.

The selected identifiers are stored to the object/class identifier storing means 11. The object/class identifier storing means 11 comprises, as shown in FIG. 9, a class/object identifier storage table 51, which has "0x2210", "0x2290", and "Player" recorded in the class/object identifier column; either "O" (Object) or "C" (Class) is recorded as the type for each of them.

Suppose here that the user selects "task A", "task B", and "task C" from the task identifier list 40 stored in the task identifier information storing means 16 by the task specifying means 12.

The task identifiers of the selected "task A", "task B" and "task C" are stored in the task identifier storing means 13. The task identifier storing means 13 has a task identifier storage table 52 as shown in FIG. 10, to which "1", "2", and "3" are recorded as the task identifiers.

Figure 11:
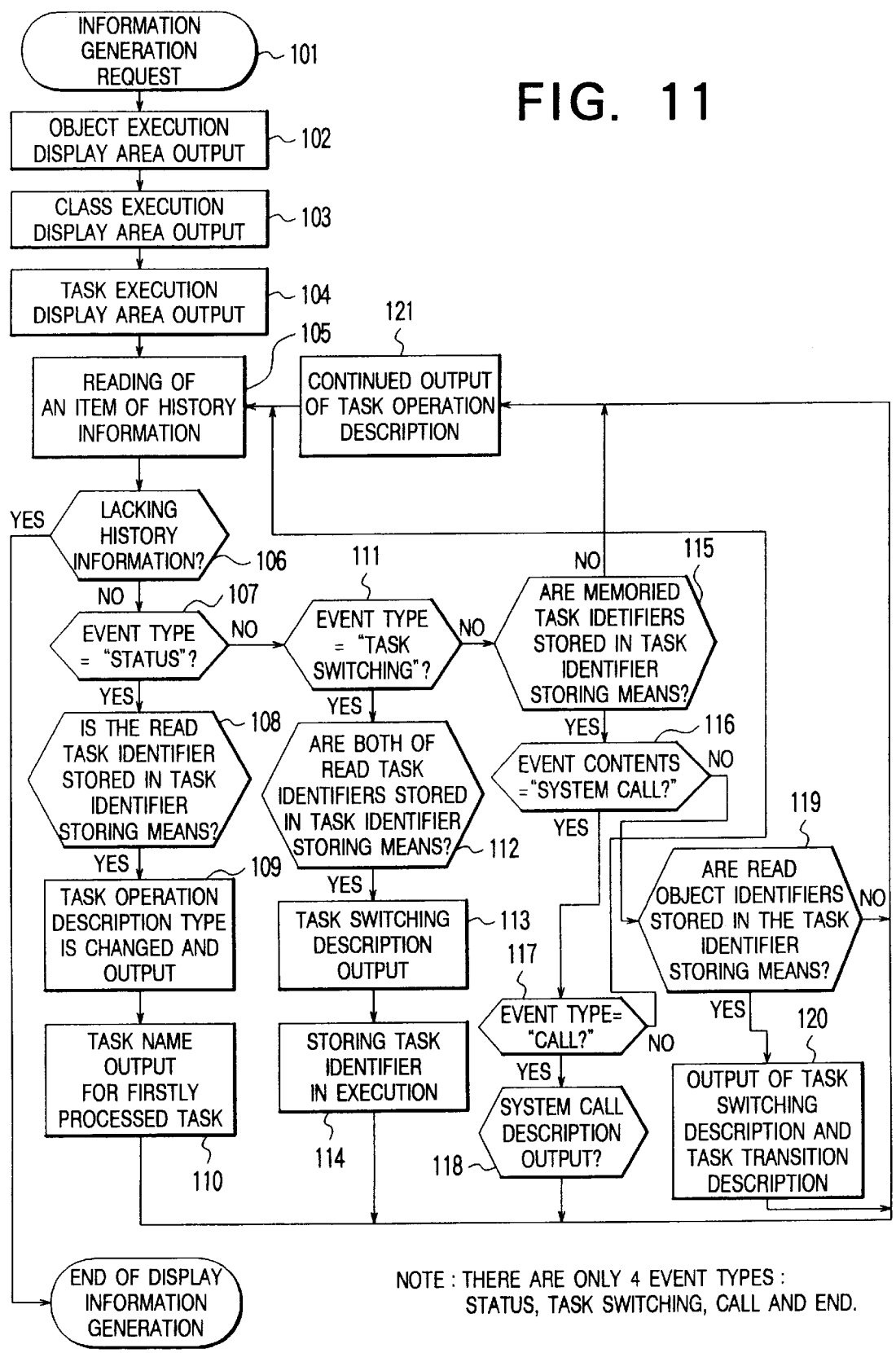
FIG. 11 is a flowchart to show an operation example of the debug assisting apparatus of FIG. 1.
Figure 12:
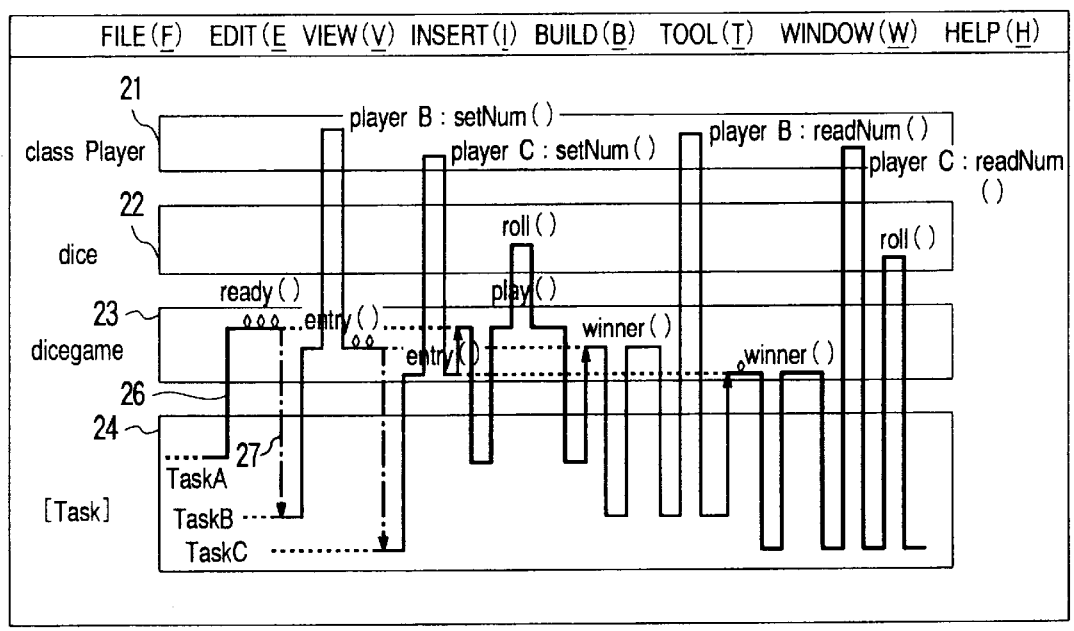
FIG. 12 is a diagram to show an example of display results for the debug assisting apparatus of FIG. 1.
Figure 13:
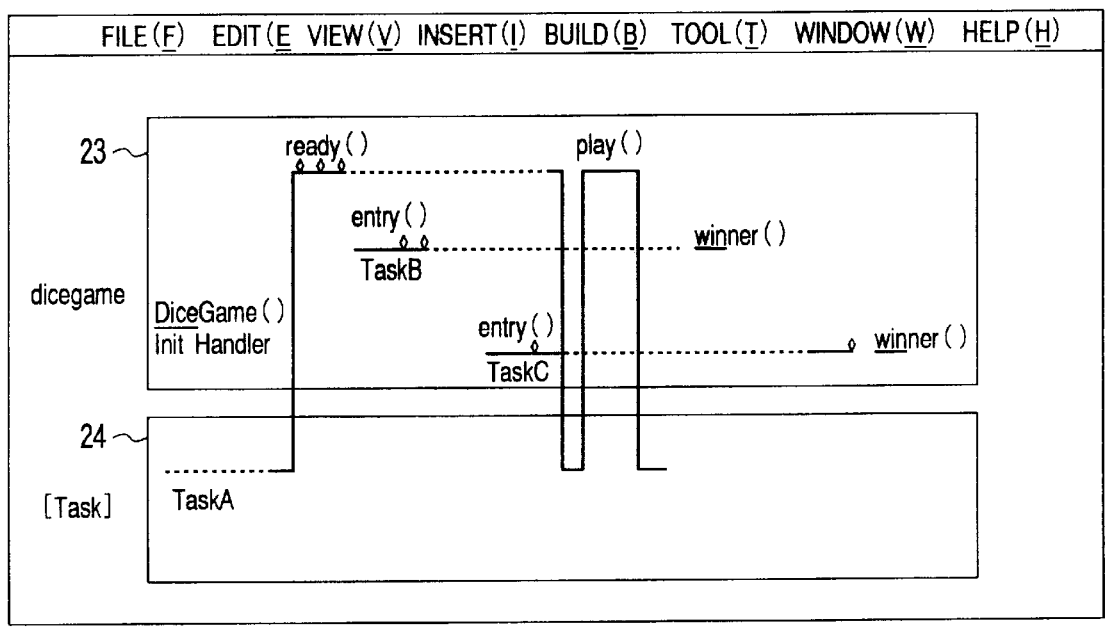
FIG. 13 is a diagram to show an example of display results for the debug assisting apparatus of FIG. 1.

Referring to the history information table 50 in FIG. 8 and FIGS. 11 to 13, the history output operation will be described below. FIG. 11 is a flowchart to show the operation of the output data generating means 8 and FIGS. 12 and 13 show examples of display.

When the user inputs a display request on the input/output means 7, the input/output means 7 requests the output data generating means 8 to generate the display data, or issues an information generation request. To make the description easier to understand, it is supposed here that the task names and function names (method names) are output but that the system call names are not generated.

As shown in FIG. 11, when the output data generating means 8 receives the information generation request from the input/output means 7 (Step 101), it sequentially reads the history information in the history storing means 9 and generates the display data based on the history information.

Specifically, object execution display areas (dice display area 22 and dicegame display area 23) for "Object dice" and "Object dicegame" stored in the object/class identifier storing means 11 are firstly output (Step 102). Then, a class execution display area (class Player display area 21) for "Player class" is output (Step 103), and a task execution display area 24 is output (Step 104). Thus, the display area data output from the output data generating means 8 are input into the input/output means 7 and displayed on the monitor display screen as shown in FIG. 12.

After output of the display area data, the output data generating means 8 reads the history information pieces one by one from the history information table 50 of the history storing means 9 (Step 105). If there is no history information (Step 106), it terminates the generation of display information. If there is some history information, it generates and outputs the output data corresponding to the history.

When history information is found and its event type is "status" ("Yes" for Step 107), it is checked whether the read task identifier is stored in the task identifier storing means 13 (Step 108). It this is "yes", the type of the task operation description is changed and output (Step 109). If it is a task processed for the first time, the task name is output (Step 110).

When the event type of the history information is not "status" ("No" for Step 107), it is checked whether the event type is "task switching" or not (Step 111). If the outcome of the checking is "yes" ("Yes" for Step 111), it is checked whether both of the two read task identifiers are stored in the task identifier storing means 13 (Step 112). If they are stored, the task switching description is output (Step 113) and the task identifier in operation is stored (Step 114).

On the other hand, if the event type is not "task switching" ("No" for Step 111), it is checked whether the task identifiers being stored are both stored in the task identifier storing means 13 (Step 115). If they are stored, it is checked whether the event content is system call (Step 116) or not. If this is "yes" ("Yes" for Step 116), whether the event type is "call" or not is checked (Step 117). If the type is "call", the system call description is output (Step 118).

When the event content is not system call ("No" for Step 116), it is checked whether the read object identifier is stored in the object/class identifier storing means 11 (Step 119). If it is stored, the task switching description and task transition description are output. If the identifier is not stored in the processing of Step 115 or 119, the task operation description is continuously output (Step 121).

Specific data generation operation is described now.

In the history information table 50 of FIG. 8, task A identified as the first item of history or 1), which is namely identified as the task identifier "1", has the event type "status" of history information and are stored in the task identifier storing means 13. Since task A is in "Ready" status at this timing, a task operation description 25 is output in dotted line, for example, in the task execution display area 24 of FIG. 12. The task name description or the data "Task A" is output under the dotted line. After that, task A continues to output the task operation description 25 for every event until the status is changed.

For 2), task B identified as the task identifier "2" is stored in the task identifier storing means 13. Since its status is "Dormant", however, nothing is output here.

For 3), task C identified as the task identifier "3" is stored in the task identifier storing means 13. Since its status is Dormant, however, nothing is output.

For 4), the execution task is switched to Init Handler. However, since the task identifier storing means 13 has no specification ("none" in the task/object column), nothing is output.

For 5) to 12), nothing is output since Init Handler is being executed.

For 13), the execution task is switched to Init Handler. However, since nothing is specified in the task identifier storing means 13 ("0" in the task/object column), nothing is output.

For 14), task A is stored in the task identifier storing means 13. Since it enters "Run" status, the task operation description is output in solid line on the task execution display area 24. It continues such output for every event until status is changed.

For 15), task A is being executed. Since Object "dicegame" is stored in the object/class identifier storing means 11, a task connection description 26 is output in solid line from the task execution display area 24 to the "dicegame" display area 23 so that the task operation description is output on the dicegame display area 23. After that, the task operation description output is continued for every event until task status is changed. Besides, method name "ready( )" is output above the task operation description.

For 16), the function "wup_tsk( )" is found to be a system call since it is registered in the system call information storing means 17. A rhombus for system call display is output above the task operation description of task A.

For 17), task B is stored in the task identifier storing means 13. Since it enters "Ready" status, the task operation description is output in dotted line on the task execution display area 24. The task name is output under the dotted line here. After that, the task operation description output is continued until task status is changed.

For 18), nothing is output though the system call is terminated.

For 19), the function "wup_tsk( )" is found to be a system call since it is registered in the system call information storing means 17. A mark (rhombus-shaped mark, for example) for system call display is output above the task operation description of task A.

For 20), task C is stored in the task identifier storing means 13. Since it enters "Ready" status, the task operation description is output in dotted line on the task execution display area 24. The task name is output under the dotted line here. After that, the task operation description output is continued until task status is changed.

For 21), nothing is output though the system call is terminated.

For 22), the function "wai_tsk( )" is found to be a system call since it is registered in the system call information storing means 17. A rhombus mark for system call display is output above the task operation description of task A.

For 23), task A is stored in the task identifier storing means 13. Since it enters "Wait" status, the task operation description is continued to be output in dashed line on the dicegame display area 23. After that, the output is continued until task status is changed.

For 24), the operation is switched from task A to task B. Since both of them have their identifiers stored in the task identifier storing means 13, a task switching description 27 is output with an arrow.

For 25), task B is stored in the task identifier storing means 13. Since it enters "Run" status, the task operation description is output in solid line on the task execution display area 24. After that, the output is continued until task status is changed.

For 26), task B is being executed. Since "dicegame" is stored in the object/class identifier storing means 11, the task connection description is output in solid line from the task execution display are 24 onto the dicegame display area 23 and the method name "entry( )" is output above the solid line.

For 27), task B is being executed. Since class "Player" is stored in the object/class identifier storing means 11, the task connection description is output in solid line from the dicegame display area 23 onto the class Player display area 21 and the object name "player B" and method name "setNum( )" are output above such solid line.

For 28), since execution of the method "setNum( )" is completed, the task connection description is output in solid line from the class Player display area 21 onto the dicegame display area 23 and the task operation description is output in solid line on the dicegame display area 23. After that, the output is continued until task status is changed.

For 29), the function "set_flg( )" is found to be a system call since it is registered in the system call information storing means 17. A rhombus mark for system call display is output above the task operation description of task B.

For 30), nothing is output though the system call is terminated.

For 31), since task B is being executed, the task operation description is output in solid line on the dicegame display area 23. The function "wai_flg()" is found to be a system call since it is registered in the system call information storing means 17 and a rhombus mark for system call display is output above the task operation description.

For 32), task B is stored in the task identifier storing means 13. Since it enters "Wait" status, the task operation description is continued to be output in dashed line on the dicegame display area 23. After that, the output is continued until task status is changed.

For 33), the operation is switched from task B to task C. Since both of them have their identifiers stored in the task identifier storing means 13, the task switching description is output with an arrow.

For 34), task C is stored in the task identifier storing means 13. Since it enters "Run" status, the task operation description is output in solid line on the task execution display area 24. After that, the output is continued until task status is changed. The similar processing is repeated.

As a result, execution progress and object operations for task A, task B, and task C corresponding to the user's selection are chronologically displayed on the monitor display screen as shown in FIG. 12. The user can easily understand how the object to which the user is paying attention is operated by task A, task B, and task C on this screen. This makes it easy for a user to find bugs concealed in the program created by the user himself/herself.

Next, the display condition change or the function to display the specified particular object only (hereinafter referred to as the "object priority display") will be described below.

In this debug assisting apparatus, the display contents can be changed by the user's specifying the desired conditions.

Suppose, for example, the specification for task B and task is canceled by the task specifying means 12, the dicegame object display area 23 alone is specified by the input/output means 7 and the object priority display is requested. The output data generating means 8 generates the output data as follows according to the history information table 50 of FIG. 8.

The procedure is described below according to the order of history in the history information table 50 of FIG. 8.

For 1), task A is stored in the task identifier storing means 13. Since it is in "Ready" status, the task operation description is output in dotted line on the task execution display area 24 and the task name is output under such dotted line. After that, the task operation description is continued to be output to the task execution display area 24 until the status is changed.

For 2), task B is not stored in the task identifier storing means 13 and nothing is output.

For 3), task C is not stored in the task identifier storing means 13 and nothing is output.

For 4), the execution task is switched to "Init Handler". However, since nothing is specified in the task identifier storing means 13, nothing is output.

For 5), since "dicegame" is specified for priority display, "Init Handler" outputs the task operation description in solid line on the dicegame display area 23 though it is not specified and outputs the method name ("DiceGame( )"). The task name is output under the solid line. After that, the task operation description output to the dicegame display area 23 is continued until task status is changed.

For 6), the output of solid line onto "dicegame" display area 23 is stopped.

For 7) to 12), nothing is output since "Init Handler" is being executed.

For 13) to 19), description is omitted since the processing contents are the same as those in the above example.

For 20), nothing is output since task C is not stored in the task identifier storing means 13.

For 21) to 23), description is omitted since the processing contents are the same as those in the above example.

For 24), the operation is switched from task A to task B, but nothing is output since the object priority display is specified.

For 25), nothing is output since task B is not stored in the task identifier storing means 13.

For 26), since "dicegame" is specified for priority display, task B outputs the task operation description in solid line on the dicegame display area 23 though it is not specified and outputs the method name ("entry ( )") The task name is output under the solid line. After that, the task operation description output on the dicegame display area 23 is continued until task status is changed.

For 27) to 28), task B is being executed. Since the object priority display is specified, the task operation description of task B is continued to be output on the dicegame display area 23.

For 29) to 32), description is omitted since the processing contents are the same as those in the above example.

For 33), the operation is switched from task B to task C, but nothing is output since the object priority display is specified.

For 34), nothing is output since task C is not stored in the task identifier storing means 13. After that, similar processing is repeated.

The output data thus generated by the output data generating means 8 are input into the input/output means 7 and displayed on the monitor display screen as shown in FIG. 13.

In FIG. 13, the specification for task B and task C is canceled by the task specifying means 12 and the object priority display is requested by specifying the dicegame object. Thus, the object display area 23 for dicegame and the task execution display area 24 for task A are displayed on the display screen, with showing the temporal execution progress of task A operating the dicegame object alone. The user can easily understand how the object to which the user is paying attention is operated by task A on this screen.

Thus, by this debug assisting apparatus, the user can visually and chronologically check the object the user is paying attention to. The user can check how the applicable object is operated by task A, task B, and task C with displaying the execution progress of task A, task B, and task C operating the objects of the debugged (or tested) subject in association with the object operation, when the application program 2 as a multitask program written in object-oriented language is debugged (or tested).

As a result, the user can efficiently debug (or test) the application program 2 created by the user.

Though such case is omitted in the above embodiment, it seems possible that the task operation description is displayed at two places when both of "class Player" object and "player B" object are specified. In such case, however, the task operation description is displayed on one of the areas specified by the user. The task operation description is not displayed on both.

Figure 14:
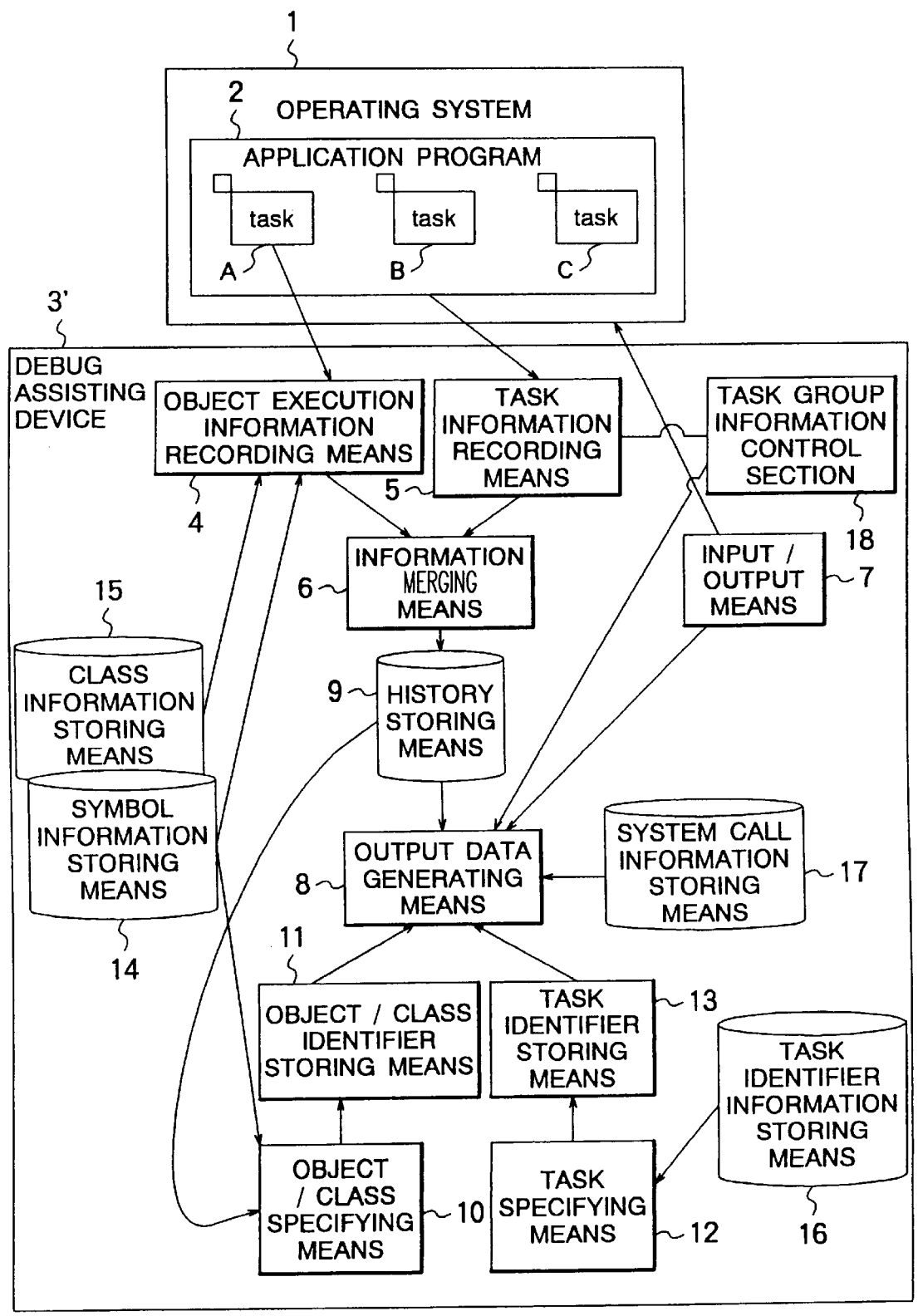
FIG. 14 is a diagram to show the configuration of a debug assisting apparatus according to an embodiment of the present invention.
Figure 15:
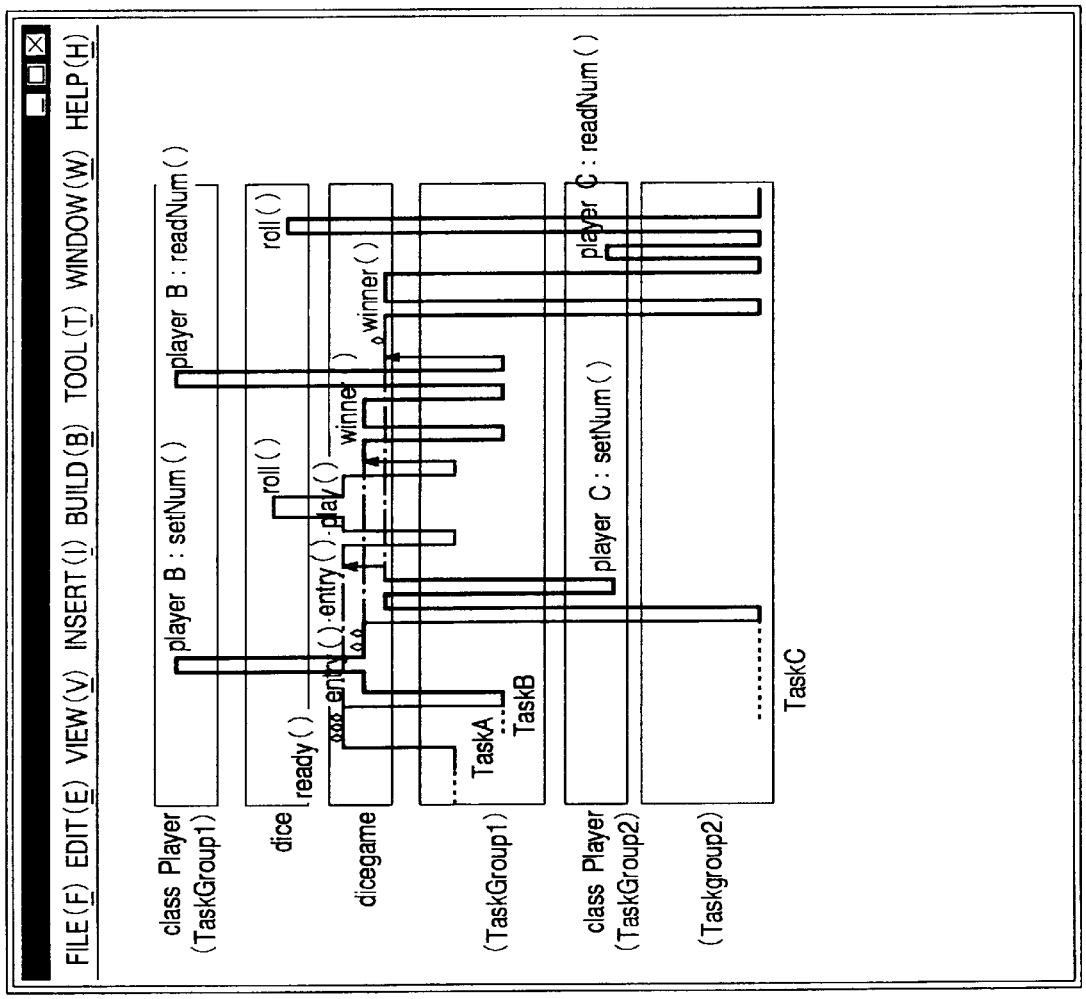
FIG. 15 is a diagram to show an example of display results for the debug assisting apparatus of FIG. 1.

Next, referring to FIGS. 14 and 15, the division/selection display operation for each task group is described.

FIG. 14 is a diagram showing the configuration of a debug assisting apparatus as an embodiment of the multitask processor according to the present invention. As shown in the figure, the debug assisting apparatus 3 is configured by adding a task group information control section 18 to control the task group information. In FIG. 14, the functions equivalent to those in FIG. 1 are provided with the same numbers and their explanation is omitted.

FIG. 15 is a diagram to show an example of display result of the debug assisting apparatus having the configuration of FIG. 14.

The division/selection display for each task group particularly corresponds to "Thread" of Java language. It is conducted by considering the nature of Thread. The description below is made on the conditions as follows:

Thread can be made to belong to a Thread group when generated.

Thread groups can be nested in a tree shape.

In the description below, however, the word "task" is used instead of "Thread".

The operation of the division/selection display for each task group on the debug assisting apparatus with such configuration is described now.

In execution, the task information recording means 5 firstly records the group to which a certain task contained in the application program 2 belongs. Alternatively, it records the initial status of the task (The applicable task group). For example, it is recorded that Task A and Task B belong to task group 1 (indicated as "TaskGroup1") and Task C belongs to task group 2 (indicated as "TaskGroup2").

Then, the task group information is prepared from the task information and the information of the group recorded in the task information recording means 5. The prepared task group information is controlled by the group information control section 18. For example, using the information recorded in the task information recording means 5, task group information is prepared as follows: "TaskA: TaskGroup1", "TaskB: TaskGroup1" and "TaskC: TaskGroup2".

The user may specify whether to divide the task area into sections for the individual task groups or to have several task groups share the area. When it is specified that the task area is to be displayed with division for the task groups, the task area is divided into TaskGroup1 and TaskGroup2 as shown in FIG. 15, for example.

When the user specifies that the task area is to be shared by several task groups, one task area is assigned to the groups specified for common sharing. No diagram is shown for this case.

The user may also specify whether to divide each class area into sections for the individual task groups or to have several task groups share the area. In this case, the class area is displayed with division into sections for task groups. For example, the class area is divided into "TaskGroup1" class section and "TaskGroup2" class section, as shown in FIG. 15.

Thus, the division/selection display for each task group as described above achieves improvement of efficiency, particularly for debugging of a multi-thread program in Java language and debugging corresponding to the thread nature.

It is naturally understood that the present invention is not limited to the embodiment described above and can be variously modified within the scope and spirit of the present invention.

For example, a debug assisting apparatus has been described as the subject to materialize the technical ideas of the present invention in the above embodiment, but it is possible to apply the same technical ideas to multitask processors in general. It is also possible to apply the technical ideas of the present invention to the multitask processing method and multitask processing display method. In addition, the technical ideas of the present invention can be also achieved by the storage medium recording a program to have the computer perform the above functions.

Though system call names are not displayed in the above embodiment, they can be indicated. Further, function call parameters are not recorded or displayed as the event contents above, but they can be recorded or/displayed.

As described above, the present invention records the debugged task execution information and the information of the object operated by the task chronologically as history when debugging (or testing) a multitask object-oriented program so that the execution situation of the desired task and the object operation can be sequentially output or displayed in association. With such display, the user can easily find a bug where the task switching by scheduling and the access to the object are made in an unexpected order, for example. It enables the user to debug (or test) the program created by the user efficiently. This may improve the working efficiency of debugging or test.

What is claimed is:

1. A multitask processing apparatus which expresses respective task executions, the apparatus comprising:

task information recording means for sequentially recording respective task executions information which includes information about a task switching by a multitask operating system and is obtained by execution of a multitask processing program;

object execution information recording means for sequentially recording object information about an object in said program, said object being operated by a task;

means for sequentially combining said respective task executions information recorded by said task information recording means and said object information recorded by said object execution information recording means;

means for displaying sequentially said object information based on the object operation by the task;

means for displaying sequentially said respective task executions information based on the execution of the multitask processing program; and means for expressing a start and an end of the object operation by the task and a break and a resume of the respective task executions by the task switching by use of a line which associates the sequentially displayed respective task executions information with the sequentially displayed object information, based on a result obtained by the means for sequentially combining.

2. A multitask processing apparatus which generates data for simulating an operation of an object, the apparatus comprising:

task information recording means for sequentially recording first information about respective tasks obtained by execution of a program written in object-oriented language for multitask processing;

object information recording means for sequentially recording second information about an object in said program, said object being operated by said task;

means for generating third information about operation history of said program by sequentially combining the first information recorded by said task information recording means and the second information recorded by said object information recording means;

a history storage means for storing said third information generated;

means for appointing a particular object and a particular task; and means for generating data for simulating operation of the particular object in association with the particular task, based on the third information stored by said history storage means.

3. The multitask processing apparatus as set forth in claim 2 further comprising:

means for generating a first display area corresponding to a task and a second display area corresponding to an object; and means for generating the third information stored in said history storage means in said second display area for the particular object and in said first display area for other objects.

4. The multitask processing apparatus as set forth in claim 2 further comprising:

means for generating the information about such status change of a task when the third information stored in said history storage means shows a status change of the task; and means for generating information about task switching when the task in operation is switched.

5. The multitask processing apparatus as set forth in claim 3 further comprising:

means for exclusively describing said first information for each task in said second display area.

6. The multitask processing apparatus set forth in claim 3 further comprising:

means for storing the identifier related to an object to be displayed; and means for generating said first information in said second display area for the object containing a method when said object not having said stored identifier is executed from the method contained in the object having said stored identifier.

7. A multitask processing apparatus which expresses respective task executions, the apparatus comprising:

means for generating history information by sequentially combining respective task executions information including task switching information obtained by execution of a program for multitask processing and information of an object in said program, said object being operated by a task;

means for displaying sequentially the object information based on the object operation by the task;

means for displaying sequentially said respective task executions information based on the execution of the multitask processing program; and means for expressing a start and an end of the object operation by the task and a break and a resume of the respective task executions by the task switching by use of a line which associates the sequentially displayed respective task executions information with the sequentially displayed object information, based on the generated history information.

8. A multitask processing method which expresses respective task executions, the method comprising the steps of:

sequentially recording respective task executions information including task switching information obtained by execution of a multitask processing program;

sequentially recording object information about an object in said program, said object being operated by a task;

sequentially combining said recorded respective task executions information and said recorded object information;

sequentially displaying said object information based on the object operation by the task;

sequentially displaying said respective task executions information based on the execution of the multitask processing program; and expressing a start and an end of the object operation by the task and a break and a resume of the respective task executions by the task switching by use of a line which associates the sequentially displayed respective task executions information with the sequentially displayed object information, based on a result obtained by the step of sequentially combining.

9. A multitask processing method which generates data for simulating an operation of an object, the method comprising the steps of:

sequentially recording first information about respective tasks obtained by execution of a program written in object-oriented language for multitask processing;

sequentially recording second information about an object in said program, said object being operated by said task;

generating third information about operation history of said program by sequentially combining said first information and said second information;

appointing a particular object and a particular task; and generating data simulating operation of the particular object in association with the particular task, based on the third information.

10. The multitask processing method as set forth in claim 9 further comprising the steps of:

generating a first display area corresponding to a task and a second display area corresponding to an object; and generating said third information in said second display area for said object and in said first display area for other objects.

11. The multitask processing method as set forth in claim 9 further comprising the steps of:

generating, when said third information shows a status change of a task, the information about such status change of the task; and generating information about task switching when the task in operation is switched.

12. A multitask processing display method which expresses respective task executions, the method comprising the steps of:

generating history information by sequentially combining respective task executions information including task switching information obtained by execution of a program for multitask processing and information of an object in said program, said object being operated by a task;

displaying sequentially the object information based on the object operation by the task;

displaying sequentially said respective task executions information based on the execution of the multitask processing program; and expressing a start and an end of the object operation by the task and a break and a resume of the respective task executions by the task switching by use of a line which associates the sequentially displayed respective task executions information with the sequentially displayed object information, based on the generated history information.

13. A multitask processing display method which expresses respective task executions, the method comprising the steps of:

sequentially recording first information about respective tasks obtained by execution of a program written in object-oriented language for multitask processing;

sequentially recording second information about an object in said program, said object being operated by task;

generating third information about operation history of said program by sequentially combining said first information and said second information;

displaying sequentially the second information based on the object operation by the task;

displaying sequentially the first information based on the execution of the multitask processing program; and expressing a start and an end of the object operation by the task and a break and a resume of the respective task executions by a task switching by use of a line which associates the sequentially displayed first information with the sequentially displayed second information, based on the generated third information.

14. A medium on which a program, which expresses respective task executions of a multitask processing program, is recorded, the program comprising the steps of:

sequentially recording respective task executions information including task switching information obtained by execution of the multitask processing program;

sequentially recording object information about an object in said multitask processing program, said object being operated by a task;

sequentially combining the recorded respective task executions information and the recorded object information;

displaying sequentially the object information based on the object operation by the task;

displaying sequentially said respective task executions information based on the execution of the multitask processing program; and expressing a start and an end of the object operation by the task and a break and a resume of the respective task executions by the task switching by use of a line which associates the sequentially displayed respective task executions information with the sequentially displayed object information, based on a result obtained by the sequentially combining.

15. A medium on which a program, which generates data for simulating an operation of an object of a multitask processing program, is recorded, the program comprising the steps of:

recording first information about respective tasks obtained by execution of the multitask processing program written in object-oriented language;

sequentially recording second information about an object in the multitask processing program, said object operated by a task;

generating third information about an operation history of the multitask processing program by sequentially combining the recorded first information and the recorded second information;

storing said third information generated;

appointing a particular object and a particular task; and generating data simulating operation of the particular object in association with the particular task, based on the stored third information.

16. The medium as set forth in claim 15, wherein the program further comprises the steps of:

generating a first display area corresponding to a task and a second display area corresponding to an object; and generating the third information in said second display area for the particular object and in said first display area for other objects.

17. The medium as set forth in claim 15, wherein the program further comprises the steps of:

generating, when the stored third information shows a status change of a task, the information about such status change of the task; and generating information about task switching when the task in operation is switched.

18. The medium as set forth in claim 16, wherein the program further comprises the step of:

describing exclusively said first information for each task in said second display area.

19. The medium as set forth in claim 16, wherein the program further comprises the steps of:

storing the identifier related to an object to be displayed; and generating said first information in said second display area for the object containing a method when said object not having said stored identifier is executed from the method contained in the object having said stored identifier.

20. A medium on which a program, which expresses respective task executions of a multitask processing program, is recorded, the program comprising the steps of:

generating history information by sequentially combining respective task executions information including task switching information obtained by execution of the multitask processing program and information of an object in the multitask processing program, said object being operated by a task;

displaying sequentially the object information based on the object operation by the task;

displaying sequentially said respective task executions information based on the execution of the multitask processing program; and expressing a start and an end of the object operation by the task and a break and a resume of the respective task executions by the task switching by use of a line which associates the sequentially displayed respective task executions information with the sequentially displayed object information, based on the generated history information.

* * * * *

UNITED STATES PATENT AND TRADEMARK OFFICE
CERTIFICATE OF CORRECTION

PATENT NO. : 6,131,109
DATED : October 10, 2000
INVENTOR(S) : Katsuhiko Ueki et al.

Page 1 of 1

It is certified that error appears in the above-identified patent and that said Letters Patent is hereby corrected as shown below:

Column 6,
Line 29, delete "are" after task.

Column 11,
Lines 52 and 53, in the first occurrence delete "and task".

Signed and Sealed this

First Day of January, 2002

Attest:

Attesting Officer

JAMES E. ROGAN
Director of the United States Patent and Trademark Office